Patented May 2, 1933

1,906,618

UNITED STATES PATENT OFFICE

PAUL KLEIN, OF BUDAPEST, HUNGARY, AND ANDREW SZEGVARI, OF AKRON, OHIO, ASSIGNORS TO AMERICAN ANODE INC., OF AKRON, OHIO

DIRECT MANUFACTURE OF HOMOGENEOUS RUBBER GOODS FROM RUBBER DISPERSIONS

No Drawing. Application filed April 13, 1927, Serial No. 183,608, and in Hungary April 15, 1926.
Renewed April 26, 1932.

This invention relates to process for the direct manufacture of homogeneous rubber goods from aqueous dispersions of rubber compositions. In certain processes of this character, the rubber is deposited from the aqueous dispersion by electrical means onto a non-conducting porous supporting surface or mold impregnated with an electrolyte so that the deposited layer is not affected by the gases liberated at the anode. A process of this character is more fully described in Patent No. 1,548,689 of August 4, 1925, in which it is stated that these porous deposit-supporting surfaces or so-called depositing backings, may consist, inter alia, of inert materials, for example, unglazed earthenware molds.

In carrying out the above process, it has been found desirable in certain cases that the deposited layer have a certain degree of firmness, i. e., the particles of the deposit should strongly cohere in order to give a firm, coherent layer of the rubber composition on the porous mold. Thus, where the mold together with the deposit is to be removed from the aqueous dispersion immediately upon completion of the deposition, the latter should be solid enough not to flow on the mold during the drying, or, where the aqueous dispersion is stirred or circulated during the deposition, the movement of the dispersion should not in any substantial way affect the material of the layer already deposited.

It has been found that a very effective way to secure such firmness of the deposited layer is to add to the electrolyte solution used for impregnating the molds, and where the molds are hollow also to the solution within the molds, certain substances which liberate in the solution ions having an agglomerating effect upon rubber and which travel, under the influence of the electric current, toward the cathode and consequently meet or cross the deposited layer. These agglomerating ions have a concentrating effect upon the rubber composition deposited and being deposited and cause the rubber particles strongly to cohere to give a firm, deposited layer. Generally, it has been found that substances, which yield under the conditions mentioned H-ions or polyvalent cations, such as the compounds of calcium, magnesium, barium, zinc, iron, aluminum, etc., or highly absorptive organic bases, or of capillaractive material, like esters or urethans, have a solidifying effect upon the deposit.

Calcium ions have been found to be particularly effective in this action. Thus, an impregnating solution for earthenware molds comprising a water solution containing 0.1 percent $CaSO_4.2H_2O$ and one-half percent ammonia is effective. Another practical solution consists of five percent ammonium sulfate, 0.1 percent $CaSO_4.2H_2O$ and one-half percent ammonia. Magnesium ions have not been found to be as effective as calcium ions in solidifying the deposit but a solution containing three percent ammonium sulfate, four percent $M_gSO_4.7H_2O$, and one-half percent ammonia may be employed with beneficial results. It has been found that for commercial operations an electrolyte solution containing an admixture of soluble calcium and magnesium compounds gives uniformly satisfactory results.

The ammonium compounds of the electrolyte solutions herein described give thereto a higher degree of solubility for the calcium and magnesium salts and render the solution slightly alkaline. Other characteristics of such electrolyte solutions are to provide a certain conductivity inside of the pores of the mold and to influence the electric surface charge from negative toward positive. This is important for the maintenance of the electric current itself and for the decreasing or suppressing of the electro-endosmotic flow of the liquids inside of the pores of the mold toward the deposited layer.

It will be obvious that the ion-producing substance need not be dissolved in the electrolyte solution, since it is sufficient that the ions be liberated under the influence of the electric current. Consequently, the earthenware mold may be coated either inside or outside or both, with the ion-producing material, or the ion-producing substance may be placed within the mold.

It has been found that in some cases where cation-producing substances are employed as above described that carbonates are precipitated out in the pores of or upon the surface of the mold. Thus, when soluble calcium compounds are employed, calcium carbonate is precipitated on the surface of the mold by the reaction of the carbonates present in the aqueous dispersion or by carbonic acid. Where the molds are used repeatedly as electrodepositing backings, the presence of the calcium carbonate interferes with the uniformity of the deposit. This objectionable precipitate may, however, be removed by dipping the mold into an acid bath, preferably of hydrochloric acid in three to ten percent concentration, and then removing the acid and soluble reaction products by washing, or the acid may be neutralized.

The term "rubber" is used in this specification and in the appended claims in a generic sense to include caoutchouc, balata, gutta percha, and other rubber-like substances, whether unvulcanized or vulcanized, or reclaimed, and whether or not admixed with other ingredients.

It will be understood that the specific examples hereinabove given are merely illustrative and that numerous variations and modifications of the process may be made without departing from the principles of this invention.

We claim:

1. In a process for the direct manufacture of homogeneous rubber goods from rubber dispersions by electrodeposition on an insoluble porous mold, the method which comprises incorporating with the porous mold a substance which under the influence of the electric current provides metallic cations capable of augmenting the cohesion of rubber particles, and thereafter electrodepositing a layer from an aqueous dispersion containing rubber on the porous mold.

2. In a process for the direct manufacture of homogeneous rubber goods from rubber dispersions by electrodeposition on an insoluble porous mold, the method which comprises impregnating the molds with an electrolyte solution containing a substance which under the influence of the electric current provides polyvalent cations capable of augmenting the cohesion of rubber particles, and thereafter electrodepositing a layer from an aqueous dispersion containing rubber on the porous mold.

3. In a process for the direct manufacture of homogeneous rubber goods from rubber dispersions by electrodeposition on an insoluble porous mold, the method which comprises impregnating the molds with an electrolyte solution containing a soluble calcium compound and a soluble magnesium compound, and thereafter electrodepositing a layer thereon from an aqueous dispersion containing rubber.

4. In a process for the direct manufacture of homogeneous rubber goods from rubber dispersions by electrodeposition on an insoluble porous mold, the method which comprises impregnating the molds with an electrolyte solution containing a soluble calcium compound, and thereafter electrodepositing a layer thereon from an aqueous dispersion containing rubber.

5. In a process for the direct manufacture of homogeneous rubber goods from rubber dispersions by electrodeposition on an insoluble porous mold, the method which comprises impregnating the molds with an electrolyte solution containing a soluble magnesium compound, and thereafter electrodepositing a layer thereon from an aqueous dispersion containing rubber.

6. In the manufacture of rubber goods from an aqueous dispersion, the method which comprises associating with a substantially water-insoluble mold at its molding surface a material containing a water-soluble substance which in water solution liberates polyvalent ions capable of augmenting the cohesion of rubber particles in an aqueous rubber dispersion, and thereafter immersing the mold in, and depositing on the molding surface by an externally applied force a self-sustaining layer from, an aqueous dispersion containing rubber.

7. In the manufacture of rubber goods directly from an aqueous dispersion containing rubber, the method which comprises applying to the molding surface of a substantially inert mold a material containing a water-soluble substance which in water solution liberates polyvalent ions capable of augmenting the cohesion of rubber particles in an aqueous dispersion of rubber, and thereafter immersing the mold in, and depositing on the molding surface by an externally applied force a substantially self-sustaining layer from, an aqueous dispersion containing rubber.

8. In the manufacture of rubber goods directly from an aqueous dispersion containing rubber, the method which comprises associating with a substantially inert mold at its molding surface a water-soluble salt of an alkaline earth, and thereafter immersing the mold in, and depositing on the molding surface by an externally applied force a self-sustaining layer from, an aqueous dispersion containing rubber.

9. In the manufacture of rubber goods directly from an aqueous dispersion containing rubber, the method which comprises applying to the molding surface of a substantially water-soluble mold a solution of a water-soluble calcium salt, and thereafter immersing the mold in, and depositing on the molding surface by an externally applied force a self-sustaining layer from, an aqueous dispersion containing rubber.

10. In the manufacture of rubber goods directly from an aqueous dispersion containing rubber, the method which comprises impregnating in insoluble porous mold with a solution of a soluble calcium salt, and thereafter immersing the mold in, and depositing on the molding surface by an externally applied force a self-sustaining layer from, an aqueous dispersion containing rubber.

In witness whereof we have hereto set our hands this 23rd day of March, 1927.

PAUL KLEIN.
ANDREW SZEGVARI.

CERTIFICATE OF CORRECTION.

Patent No. 1,906,618.  May 2, 1933.

PAUL KLEIN, ET AL.

It is hereby certified that error appears in the printed specification of the above numbered patent requiring correction as follows: Page 1, line 1, after "to" insert "a"; page 2, line 123, claim 9, for "water-soluble" read "water-insoluble"; page 3, line 2, claim 10, for " in" read "an"; and that the said Letters Patent should be read with these corrections there in that the same may conform to the record of the case in the Patent Office.

Signed and sealed this 24th day of October, A. D. 1933.

F. M. Hopkins
Acting Commissioner of Patents.

(Seal)

rubber, the method which comprises impregnating in insoluble porous mold with a solution of a soluble calcium salt, and thereafter immersing the mold in, and depositing on
5 the molding surface by an externally applied force a self-sustaining layer from, an aqueous dispersion containing rubber.

In witness whereof we have hereto set our hands this 23rd day of March, 1927.
PAUL KLEIN.
ANDREW SZEGVARI.

CERTIFICATE OF CORRECTION.

Patent No. 1,906,618.             May 2, 1933.

PAUL KLEIN, ET AL.

It is hereby certified that error appears in the printed specification of the above numbered patent requiring correction as follows: Page 1, line 1, after "to" insert "a"; page 2, line 123, claim 9, for "water-soluble" read "water-insoluble"; page 3, line 2, claim 10, for " in" read "an"; and that the said Letters Patent should be read with these corrections there in that the same may conform to the record of the case in the Patent Office.

Signed and sealed this 24th day of October, A. D. 1933.

F. M. Hopkins
Acting Commissioner of Patents.

(Seal)

CERTIFICATE OF CORRECTION.

Patent No. 1,906,618.  May 2, 1933.

PAUL KLEIN, ET AL.

It is hereby certified that error appears in the printed specification of the above numbered patent requiring correction as follows: Page 1, line 1, after "to" insert "a": page 2, line 123, claim 9, for "water-soluble" read "water-insoluble"; page 3, line 2, claim 10, for " in" read "an"; and that the said Letters Patent should be read with these corrections there in that the same may conform to the record of the case in the Patent Office.

Signed and sealed this 24th day of October, A. D. 1933.

(Seal)

F. M. Hopkins
Acting Commissioner of Patents.